(12) United States Patent
Trombetta et al.

(10) Patent No.: US 7,908,860 B2
(45) Date of Patent: Mar. 22, 2011

(54) SPLIT-SERIES SEQUENTIAL TURBOCHARGED ENGINE

(75) Inventors: Christopher Bernard Trombetta, Commerce Township, MI (US); Michael Leon Briggs, Howell, MI (US); Norbert Andreas Schorn, Aachen (DE); Daniel Joseph Styles, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 495 days.

(21) Appl. No.: 12/017,829

(22) Filed: Jan. 22, 2008

(65) Prior Publication Data
US 2009/0183506 A1 Jul. 23, 2009

(51) Int. Cl.
*F02B 33/44* (2006.01)
(52) U.S. Cl. .......................................... 60/612; 123/562
(58) Field of Classification Search ............ 60/597–612; 123/562, 559.1–565
See application file for complete search history.

(56) References Cited

U.S. PATENT DOCUMENTS

| | | | | |
|---|---|---|---|---|
| 2,739,440 A | * | 3/1956 | Reiter et al. | 60/599 |
| 3,027,706 A | * | 4/1962 | Sprick | 60/599 |
| 3,257,797 A | | 6/1966 | Lieberherr | |
| 3,906,729 A | | 9/1975 | Connor et al. | |
| 4,400,945 A | * | 8/1983 | Deutschmann et al. | 60/612 |
| 4,538,574 A | * | 9/1985 | Lombardi | 123/432 |
| 4,563,132 A | * | 1/1986 | Grimmer | 417/247 |
| 5,109,674 A | * | 5/1992 | Sudmanns | 60/612 |
| 5,142,867 A | * | 9/1992 | Bergmann et al. | 60/612 |
| 5,207,063 A | * | 5/1993 | Blake | 60/612 |
| 5,440,881 A | * | 8/1995 | Sudmanns et al. | 60/612 |
| 5,899,070 A | | 5/1999 | Droessler et al. | |
| 6,282,899 B1 | * | 9/2001 | Gladden | 60/612 |
| 6,321,538 B2 | | 11/2001 | Hasler | |
| 6,564,783 B2 | * | 5/2003 | Chou et al. | 123/559.1 |
| 6,694,736 B2 | | 2/2004 | Pflüger | |
| 7,310,947 B2 | * | 12/2007 | Baumann | 60/612 |
| 7,644,585 B2 | * | 1/2010 | Haugen | 60/612 |
| 2005/0056017 A1 | | 3/2005 | Sisken et al. | |
| 2006/0059908 A1 | | 3/2006 | Schorn et al. | |

FOREIGN PATENT DOCUMENTS

JP  6280585 A  10/1994

* cited by examiner

*Primary Examiner* — Thomas Denion
*Assistant Examiner* — Douglas J. Duff
(74) *Attorney, Agent, or Firm* — Julia Voutyras; Brooks Kushman P.C.

(57) ABSTRACT

For an internal combustion engine having two cylinder banks forming a V-shaped cylinder block, a turbocharger system including a high pressure turbocharger disposed in a valley between the cylinder banks, a first low-pressure turbocharger disposed adjacent an outer side of one of the cylinder banks, and a second low-pressure turbocharger disposed adjacent an outer side of the second cylinder bank. Intake and exhaust ducts connect the components of the engine and turbocharger system to and electronically controlled valves associated with the ducts permit the system to operate either in a split series mode or a low-pressure-only mode.

13 Claims, 4 Drawing Sheets

SPLIT-SERIES SEQUENTIAL TURBOCHARGED ENGINE

FIELD OF THE INVENTION

The invention relates to turbocharged internal combustion engines and specifically to such an engine wherein the turbocharger system includes a single high-pressure stage in series with two low-pressure stages, the low-pressure stages arranged in parallel with one another.

BACKGROUND

The benefits of applying turbocharging to an internal combustion engine are well known. These benefits include improved maximum unit power per unit engine displacement, improved volumetric efficiency, and reduced engine emissions. It is known to utilize multiple stages within a turbocharging system. In some automotive applications, one of the engineering challenges is making the system fit into the available packaging space within the vehicle engine compartment while minimizing the length of the ducting between the engine and the turbocharger components. A variety of different physical layouts of the turbocharger components have been utilized in order to meet these design requirements.

SUMMARY OF THE INVENTION

According to the invention, an internal combustion engine has a first and a second cylinder bank disposed in a V-shape defining a valley between the two cylinder banks. A split-series turbocharger system comprises a high pressure turbocharger disposed in the valley, a first low-pressure turbocharger disposed adjacent an outer side of the first cylinder bank opposite the valley, and a second low-pressure turbocharger disposed adjacent an outer side of the second cylinder bank opposite the valley. An exhaust gas system comprising a first high pressure flow path connecting the first cylinder bank with the high pressure turbocharger, a second high pressure flow path connecting the second cylinder bank with the high pressure turbocharger, a first low pressure flow path connecting the high pressure turbocharger with the first low pressure turbocharger, a second low pressure flow path connecting the high pressure turbocharger with the second low pressure turbocharger, a first bypass flow path connecting the first cylinder bank with the first low pressure turbocharger, and a second bypass flow path connecting the second cylinder bank with the second low pressure turbocharger. The system further includes an exhaust gas control system comprising at least one valve positioned in the exhaust gas system and operative to direct exhaust from the first and second cylinder banks to at least one of the first low-pressure turbocharger the second low-pressure turbocharger and the high pressure turbocharger in variable amounts in response to at least one engine operating condition.

DETAILED DESCRIPTION OF A PREFERRED EMBODIMENT

Figure 1:
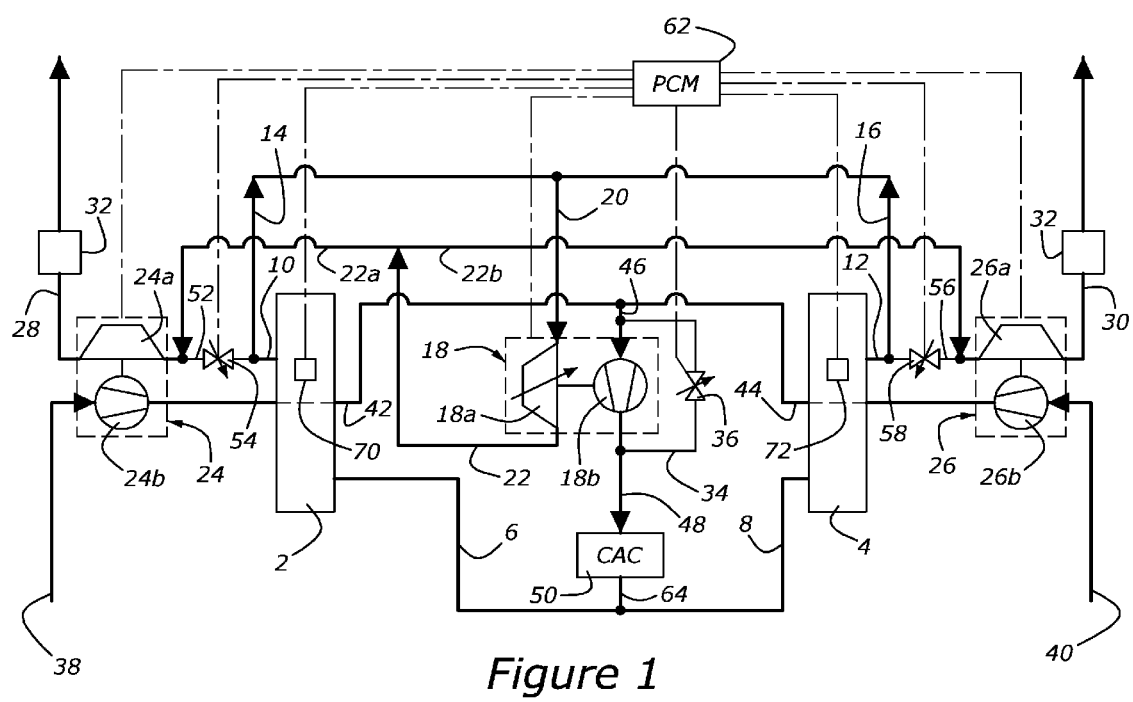
FIG. 1 is a schematic view of an engine and turbocharger system in a first operating condition.
Figure 2:
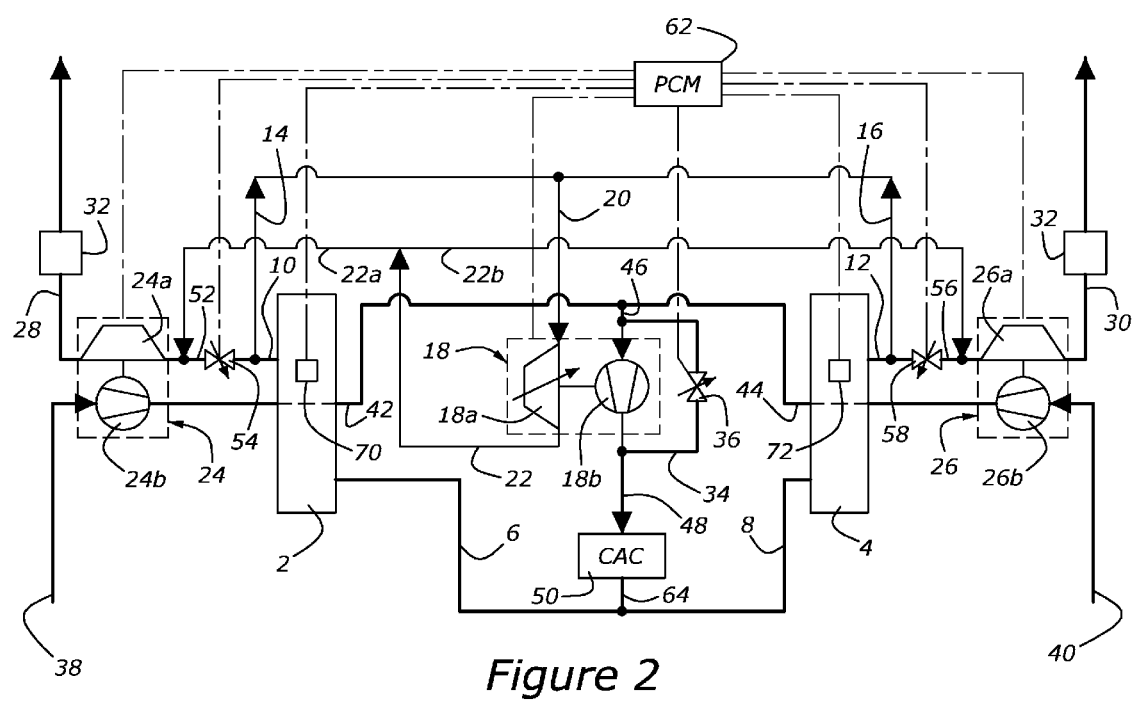
FIG. 2 is a schematic view of an engine and turbocharger system in a second operating condition.

FIGS. 1 and 2 show in schematic form an engine and turbocharger system according to an embodiment of the present invention. The engine comprises left and right cylinder banks 2, 4 each of which may have any number of cylinders. Pre-combustion air is supplied to cylinder banks through intake manifolds 6, 8 respectively and post-combustion exhaust is expelled from cylinder banks through exhaust manifolds 10, 12 respectively. High pressure turbine feed ducts 14, 16 extend from exhaust manifolds 10, 12 to a high pressure turbocharger 18. High pressure turbocharger 18 comprises a turbine portion 18a and a compressor portion 18b, as is well known in the art. The two high pressure turbine feed ducts 14, 16 are shown to join together into a single turbine intake duct 20 at a point prior to feeding into high pressure turbocharger 18, however the two high pressure turbine feed ducts may feed separately into high pressure turbocharger 18. High pressure turbine feed ducts 14, 16 and turbine intake duct 20 serve as first and second high pressure flow paths connecting cylinder banks 2, 4 with high pressure turbocharger 18

A low pressure duct 22 extends from high pressure turbocharger 18 and bifurcates into a left low pressure duct 22a and a right low pressure duct 22b. Left and right low pressure ducts 22a, 22b extend to left and right low pressure turbocharger 24, 26 respectively. Ducts 22, 22a, and 22b constitute low pressure flow paths. Low pressure turbochargers 24, 26 comprise turbine portions 24a, 26a respectively and compressor portions 24b, 26b respectively, as is well known in the art. Exhaust pipes 28, 30 extend from low pressure turbochargers 24, 26 respectively and may include exhaust aftertreatment devices 32 such as catalytic converters or diesel oxidation catalysts.

Left and right air inlet tubes 38, 40 connect with low pressure compressor portions 24b, 26b respectively. Left and right low pressure intake ducts 42, 44 extend between low pressure compressor portions 24b, 26b and high pressure compressor portion 18b. The two low pressure intake ducts 42, 44 are shown to join together into a single compressor intake duct 46 at a point prior to feeding into high pressure compressor portion 18b, however the two intake ducts may feed separately into high pressure compressor portion if desired.

Charge air cooler intake duct 48 extends from an outlet side of high pressure compressor portion 18b to a charge air cooler 50. Charge air cooler 50 is preferably an air-to-air or a fluid-to-air heat exchanger as is well known in the turbocharging art. A compressor bypass duct 34 extends from compressor intake duct 46 to charge air cooler duct 48. A bypass valve 36 is incorporated into compressor bypass duct 34. At least one charge air cooler outlet duct 64 extends from charge air cooler 50 and feeds into intake manifolds 6, 8. Intake manifolds 6, 8 extend from charge air cooler 50 to cylinder banks 2, 4. In some vehicle applications, one or more throttle bodies (not shown) may be positioned between charge air cooler 50 and intake manifolds 6, 8.

A left turbine bypass duct 52 extends between left exhaust manifold 10 and left low pressure turbine portion 24a. A left turbine bypass valve 54 is incorporated into left turbine bypass duct 52. Duct 52 and bypass valve 54 constitute a turbine bypass flow path connecting exhaust manifold 10 with the low pressure turbocharger 24. In FIGS. 1 and 2, left turbine bypass valve 54 is depicted as being located downstream from the juncture between exhaust manifold 10 and left high pressure turbine feed duct 14. It is to be understood, however, that it is also possible for left turbine bypass valve 54 to be located directly at the juncture or at any point along left turbine bypass duct 52 downstream from the juncture.

Similarly, a right turbine bypass duct 56 extends between exhaust right exhaust manifold 12 and right low pressure turbine portion 26a. A right turbine bypass valve 58 is incorporated into right turbine bypass duct 56. Duct 56 and bypass valve 58 constitute a turbine bypass flow path connecting exhaust manifold 12 with the low pressure turbocharger 26.

As is shown schematically in FIGS. 1 and 2, a powertrain control module (PCM) 62 is in electrical connection with sensors and/or control actuators related to high pressure turbocharger 18, low pressure turbochargers 24, 26, and bypass valves 36, 54, 58. As is well known in the internal combustion engine controls art, PCM 62 is a microprocessor-based device and is also connected with multiple sensors (examples of which are indicated at 70 and 72) located in or on the engine and/or other powertrain components and/or vehicle operating controls, so that the PCM 62 receives input signals indicating the operating conditions of the powertrain and/or commands of the vehicle operator. In response to these input signals and in accordance with programmed control logic, PCM 62 determines the desired amount of pressure boost to achieve desired engine operating conditions and controls high pressure turbocharger 18, low pressure turbochargers 24, 26, and bypass valves 36, 54, 58 so as to achieve said amount of boost. Turbine bypass valves 54, 58 together constitute an exhaust gas control system.

Figure 3:
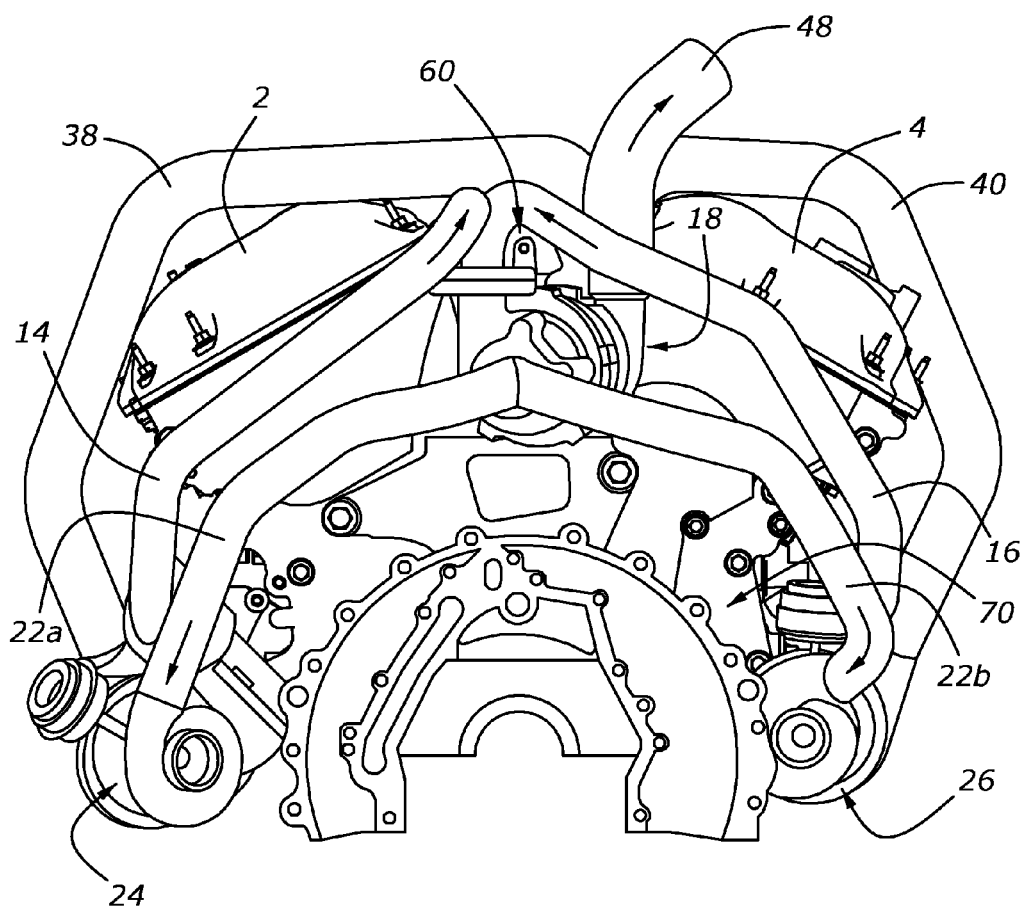
FIG. 3 is an end view of an engine and turbocharger system showing the physical placement of the turbocharger components relative to the engine block.
Figure 4:
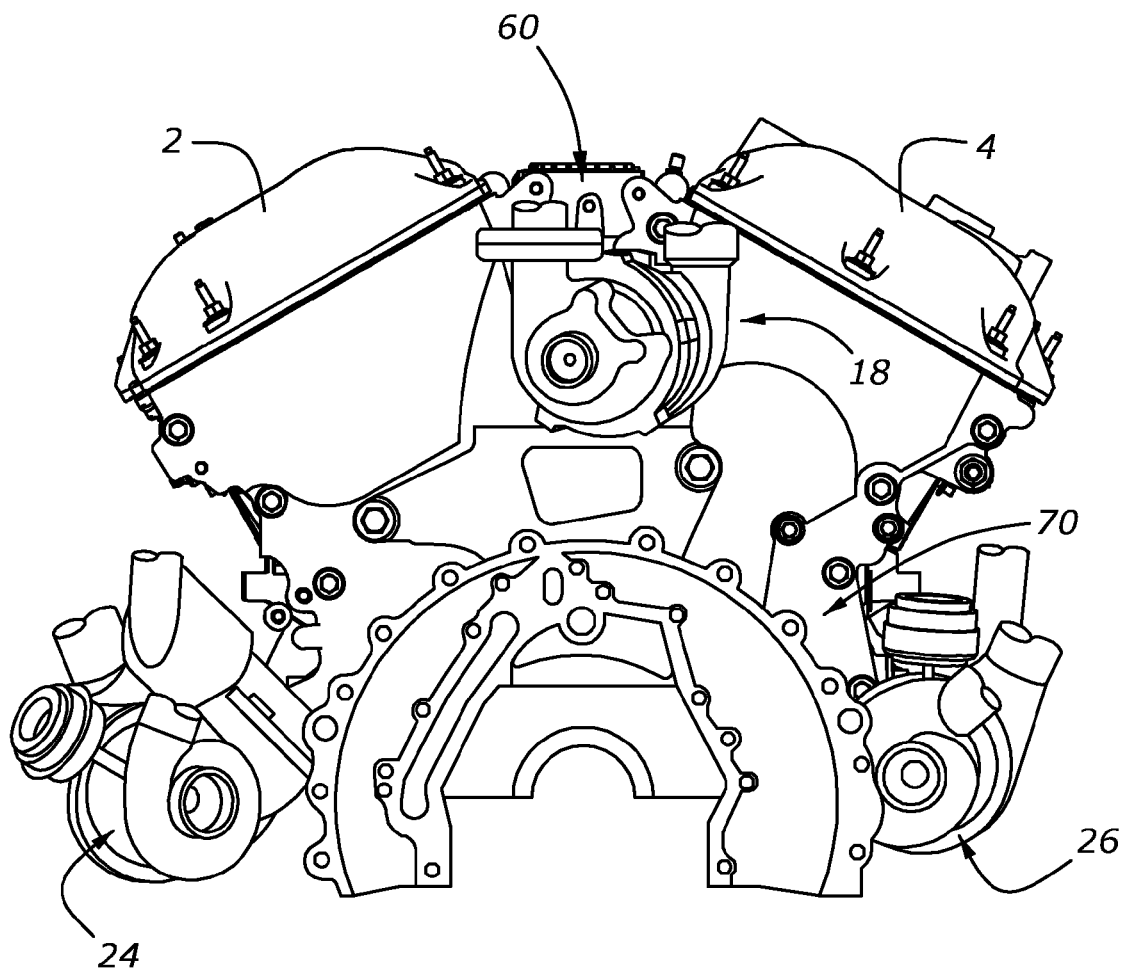
FIG. 4 is a view similar to FIG. 3 but with intake and exhaust ducts cut away for clarity.

As seen in FIGS. 3 and 4, cylinder banks 2, 4 together form an engine block 70 having a V configuration and which defines a generally V-shaped valley 60 between the cylinder banks, as is well known in the art. High pressure turbocharger 18 is positioned as deep as possible in the bottom of valley 60 so that it projects very little, if any, above the upper ends of cylinder banks 2, 4. Also in the depicted embodiment of the invention, low pressure turbochargers 24, 26 are positioned closely adjacent to the outer sides of respective cylinder banks 2, 4. This configuration of the turbocharger system is very space-efficient, resulting in a compact engine/turbo unit.

Operation of the Turbocharger System

The engine/turbocharger configuration depicted in FIGS. 1 and 2 allows the engine to operate efficiently over a wide range of engine speed and load conditions by controlling the amount of engine exhaust that is directed to high pressure turbocharger 18 and low pressure turbochargers 24, 26. At relatively low engine rotational speed, for example, it is generally desirable to utilize high pressure turbocharger 18 and low pressure turbochargers 24, 26 together in series to achieve the desired level of pressure boost. This operating condition is shown in FIG. 1. At relatively high engine rotational speed, however, it is generally more favorable to use solely or mainly the low pressure turbochargers 24, 26 while most of the exhaust gas bypasses high pressure turbocharger 18. This operating condition is shown in FIG. 2.

FIG. 1 shows the described embodiment of the invention in a first possible operating condition wherein high pressure compressor bypass valve 36 and turbine bypass valves 54, 58 are effectively closed. Because left and right turbine bypass valves 54, 58 are closed, substantially all of the exhaust gas exiting cylinder banks through exhaust manifolds 10, 12 is directed to flow through high pressure turbine feed ducts 14, 16 and turbine inlet duct 20 to high pressure turbine portion 18a where some portion of the kinetic energy of the exhaust gas is extracted by the turbine portion. After passing through high pressure turbine portion 18a, the exhaust gasses pass into low pressure duct 22 and subsequently the flow splits to pass through left and right low pressure ducts 22a, 22b to reach low pressure turbochargers 24, 26. A portion of the kinetic energy remaining in the exhaust gas is extracted by low pressure turbine portions 24a, 26a. If necessary, a portion of the exhaust gas passing through low pressure ducts 22a, 22b may be expelled through a waste gate (not shown) prior to passing through low pressure turbines 24a, 26a. Waste gate operation is controlled by PCM 62 in a manner well known in the turbocharging art. After exiting low pressure turbine portions 24a, 26a, the exhaust gasses pass through exhaust pipes 28, 30 and may then pass through one or more aftertreatment devices 32.

In the FIG. 1 operating mode, intake air enters the system through inlet tubes 38, 40 and flows through low pressure compressor stages 24b, 26b where it is compressed. The compressed air is then routed through low pressure intake ducts 42, 44 and into compressor intake duct 46. Since high pressure compressor bypass valve 36 is closed, substantially all of the intake air flows into high pressure compressor portion 18b where it is further compressed. Under some engine operating conditions, it may be desirable for high pressure compressor bypass valve 36 to be partially open so that some fraction of the intake air does not pass through high pressure compressor portion 18b. The compressed intake air exiting high pressure compressor portion 18b then passes through duct 48 and into charge air cooler 50 where it is cooled, as is well known in the art, before being supplied to cylinder banks 2, 4 through charge air cooler outlet duct 64 and intake manifolds 6, 8.

FIG. 2 shows the described embodiment of the invention in a second possible operating condition wherein high pressure compressor bypass valve 36 and turbine bypass valves 54, 58 are effectively fully open. In FIG. 2, the flow paths followed by the intake air and exhaust gasses are shown in heavy lines, while portions of the flow path that are bypassed are shown in lighter lines. Because left and right turbine bypass valves 54, 58 are open, substantially all of the exhaust gas exiting cylinder banks 2, 4 via exhaust manifolds 10, 12 flows through ducts 52, 56 directly to low pressure turbine portions 24a, 26a. That is, most of the exhaust gas does not flow through high pressure turbine feed ducts 14, 16 but rather bypasses high pressure turbine section 18a. After exiting turbine portions 24a, 26a, the exhaust gasses pass through exhaust pipes 28, 30 and may then pass through one or more aftertreatment devices 32 before being expelled from the vehicle.

In the FIG. 2 operating mode, intake air enters the system through inlet tubes 38, 40 and flows through low pressure compressor stages 24b, 26b where it is compressed. The compressed air is then routed through low pressure intake ducts 42, 44 and into compressor intake duct 46. Since compressor bypass valve 36 is open, a substantial portion of the intake air flows through compressor bypass duct 34, bypassing high pressure compressor portion 18b. The intake air then passes through charge air cooler 50 where it is cooled, as is well known in the art, before being supplied to cylinder banks through intake manifolds 6, 8.

It is to be understood that in the embodiment of the invention depicted herein, PCM 62 may command any and all of bypass valves 36, 54, 58 and turbine waste gates independently to any of the full range of positions between full open and full closed PCM 62 commands these valve positions to direct exhaust gasses to the high pressure turbocharger 18 and low pressure turbochargers 24, 26 in varying proportions as necessary to achieve the desired engine operating conditions. These valve positions are commanded by PCM 62 based on signals received from multiple sensors and the preprogrammed control logic of the PCM and may be continuously varied during vehicle operation.

While the best mode for carrying out the invention has been described in detail, those familiar with the art to which this invention relates will recognize various alternative designs and embodiments for practicing the invention as defined by the following claims.

The invention claimed is:

1. An internal combustion engine having a first and a second cylinder bank disposed in a V-shape defining a valley between the first and second cylinder banks and a turbocharger system, the system comprising:
   a high pressure turbocharger disposed in the valley;
   a first low-pressure turbocharger disposed adjacent an outer side of the first cylinder bank opposite the valley;
   a second low-pressure turbocharger disposed adjacent an outer side of the second cylinder bank opposite the valley;
   an exhaust gas system comprising a first high pressure flow path connecting the first cylinder bank with the high pressure turbocharger, a second high pressure flow path connecting the second cylinder bank with the high pressure turbocharger, a first low pressure flow path connecting the high pressure turbocharger with the first low pressure turbocharger, a second low pressure flow path connecting the high pressure turbocharger with the second low pressure turbocharger, a first turbine bypass flow path connecting the first cylinder bank with the first low pressure turbocharger and including a first turbine bypass valve, and a second turbine bypass flow path connecting the second cylinder bank with the second low pressure turbocharger and including a second turbine bypass valve wherein the first and second turbine bypass flow paths bypass the high-pressure turbine;
   an intake air system comprising a first intake air flow path connecting the first low pressure turbocharger with the high pressure turbocharger, a second intake air flow path connecting the second low pressure turbocharger with the high pressure turbocharger, and a compressor bypass flow path including a compressor bypass valve; and
   a controller operative to control the positions of at least one of the first turbine bypass valve, the second turbine bypass valve, and the compressor bypass valve in response to at least one engine operating condition.

2. The apparatus according to claim 1 wherein the first turbine bypass valve has a closed position wherein the first turbine bypass flow path is blocked and exhaust flow from the first cylinder bank is directed through the first high pressure flow path, and an open position wherein at least a portion of the exhaust flow from the first cylinder bank is directed through the first bypass flow path.

3. The apparatus according to claim 1 wherein the second turbine bypass valve has a closed position wherein the second bypass flow path is blocked and exhaust flow from the second cylinder bank is directed through the second high pressure flow path, and an open position wherein at least a portion of the exhaust flow from the second cylinder bank is directed through the second bypass flow path.

4. The apparatus according to claim 1 wherein the at least one engine operating condition is engine rotational speed.

5. The apparatus according to claim 1 wherein the first high pressure flow path and the second high pressure flow path converge into a common compressor intake duct at a point prior to feeding into the high pressure turbocharger.

6. The apparatus according to claim 1 wherein the controller comprises a powertrain control module.

7. The apparatus according to claim 1 wherein the powertrain control module is in electrical communication with and receiving input signals from at least one sensor.

8. The apparatus according to claim 1 further comprising a charge air cooler operative to cool intake air after the intake air has passed though at least one of the turbochargers.

9. An internal combustion engine having first and second cylinder banks, comprising:
   a high-pressure turbocharger having a high pressure turbine and a high-pressure compressor;
   a first low-pressure turbocharger having a first low-pressure turbine and a first low-pressure compressor;
   a second low-pressure turbocharger having a second low-pressure turbine and a second low-pressure compressor; and
   an exhaust gas system, comprising:
      a first high-pressure flow path connecting the first cylinder bank with the high-pressure turbine;
      a second high-pressure flow path connecting the second cylinder bank with the high-pressure turbine;
      a first low-pressure flow path connecting the high-pressure turbine with the first low-pressure turbine;
      a second low-pressure flow path connecting the high-pressure turbine with the second low-pressure turbine;
      a first turbine bypass flow path providing a flow path between the first cylinder bank wherei the first turbine bypass flow path bypasses the first turbine;
      a first turbine bypass valve disposed in the first turbine bypass flow path;
      a second turbine bypass flow path providing a flow path between the second cylinder bank and the second low-pressure turbine wherein the second turbine bypass flow path bypasses the second turbine; and
      a second turbine bypass valve disposed in the second turbine bypass flow path.

10. The engine of claim 9, further comprising:
   an intake air system comprising :
      a first intake air flow path connecting the first low-pressure compressor with the high-pressure compressor;
      a second intake air flow path connecting the second low-pressure compressor with the high-pressure compressor;
      a compressor bypass flow path with a first end of the compressor bypass flow path coupled upstream of the high-pressure compressor and a second end of the compressor bypass flow path coupled downstream of the high-pressure compressor; and
      a compressor bypass valve disposed in the compressor bypass flow path.

11. The engine of claim 10, further comprising:
   a controller operative to control the positions of at least one of the first turbine bypass valve, the second turbine bypass valve, and the compressor bypass valve in response to at least one engine operating parameter.

12. The engine of claim 11 wherein the controller comprises a powertrain control module.

13. The engine of claim 11, further comprising:
   at least one engine sensor electronically coupled to the controller wherein the at least one engine operating parameter is determined based on a signal from the at least one engine sensor.

* * * * *